No. 830,357. PATENTED SEPT. 4, 1906.
C. H. NESSELROAD.
BRICK MAKING MACHINE.
APPLICATION FILED APR. 30, 1906.

6 SHEETS—SHEET 1.

Witnesses
W. C. Healy

Inventor
C. H. Nesselroad
By James J. Shuhy
Attorney

No. 830,357. PATENTED SEPT. 4, 1906.
C. H. NESSELROAD.
BRICK MAKING MACHINE.
APPLICATION FILED APR. 30, 1906.

6 SHEETS—SHEET 2.

No. 830,357. PATENTED SEPT. 4, 1906.
C. H. NESSELROAD.
BRICK MAKING MACHINE.
APPLICATION FILED APR. 30, 1906.

6 SHEETS—SHEET 5.

No. 830,357. PATENTED SEPT. 4, 1906.
C. H. NESSELROAD.
BRICK MAKING MACHINE.
APPLICATION FILED APR. 30, 1906.

6 SHEETS—SHEET 6.

Witnesses

Inventor
C. H. Nesselroad
By James Shuhy
Attorney

UNITED STATES PATENT OFFICE.

CHARLES H. NESSELROAD, OF STUART, IOWA.

BRICK-MAKING MACHINE.

No. 830,357.  Specification of Letters Patent.  Patented Sept. 4, 1906.

Application filed April 30, 1906. Serial No. 314,490.

*To all whom it may concern:*

Be it known that I, CHARLES H. NESSELROAD, a citizen of the United States, residing at Stuart, in the county of Guthrie and State of Iowa, have invented new and useful Improvements in Brick-Making Machines, of which the following is a specification.

My invention pertains to machines for making bricks and other articles of plastic material; and it has for one of its objects to provide a machine through the medium of which bricks and other articles may be perfectly formed of plastic material in rapid succession.

Another object of the invention is the provision of a reliable and easily-operated hand-machine for doing the work stated.

Another object is the provision of a machine which is adapted with the use of interchangeable parts to make bricks and other articles of various forms and having backs and faces of different kinds.

Other objects of the invention will be fully appreciated from the following description and claims when the same are read in connection with the accompanying drawings, forming part of this specification, in which—

Figure 1:
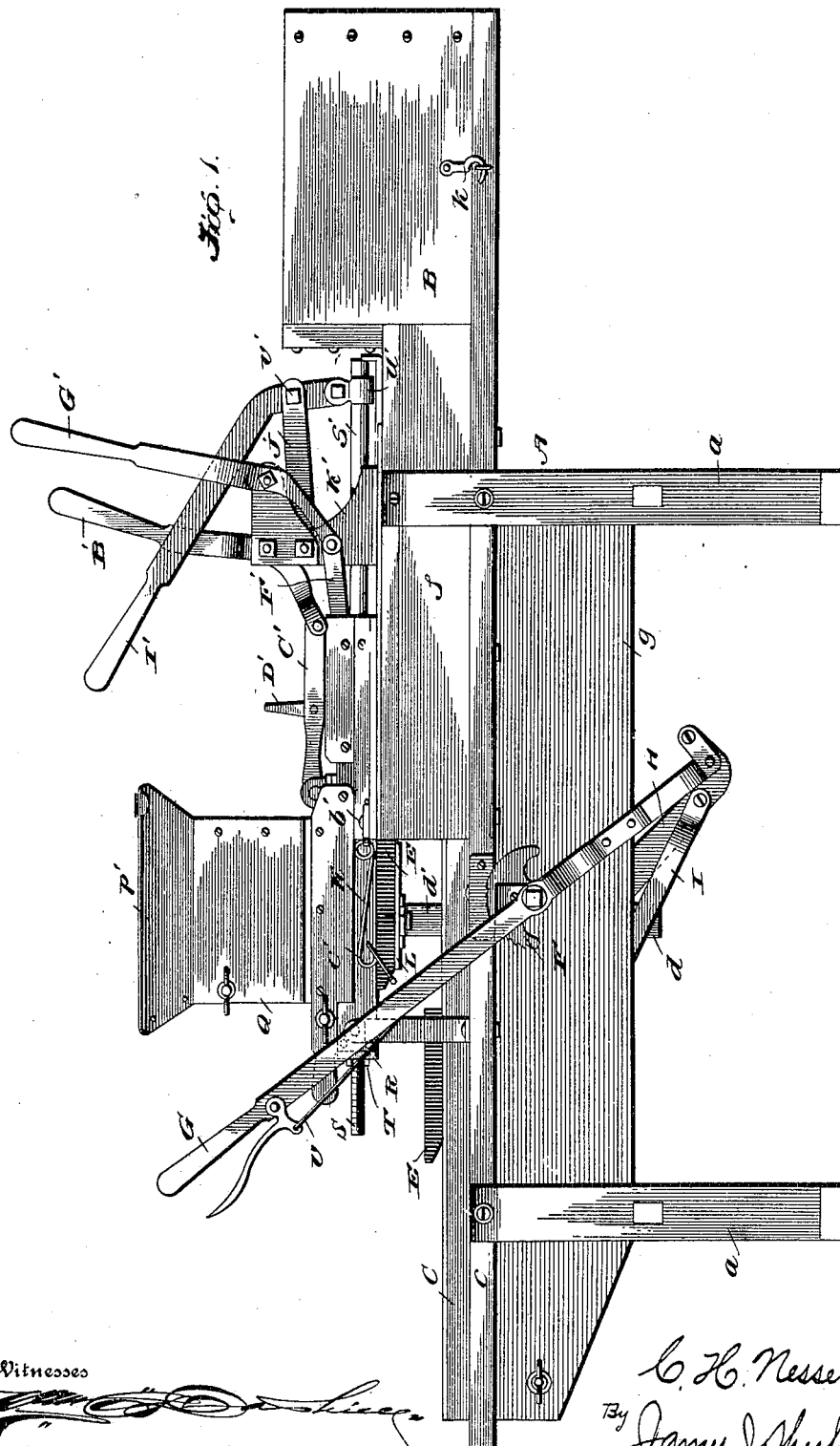
Figure 2:
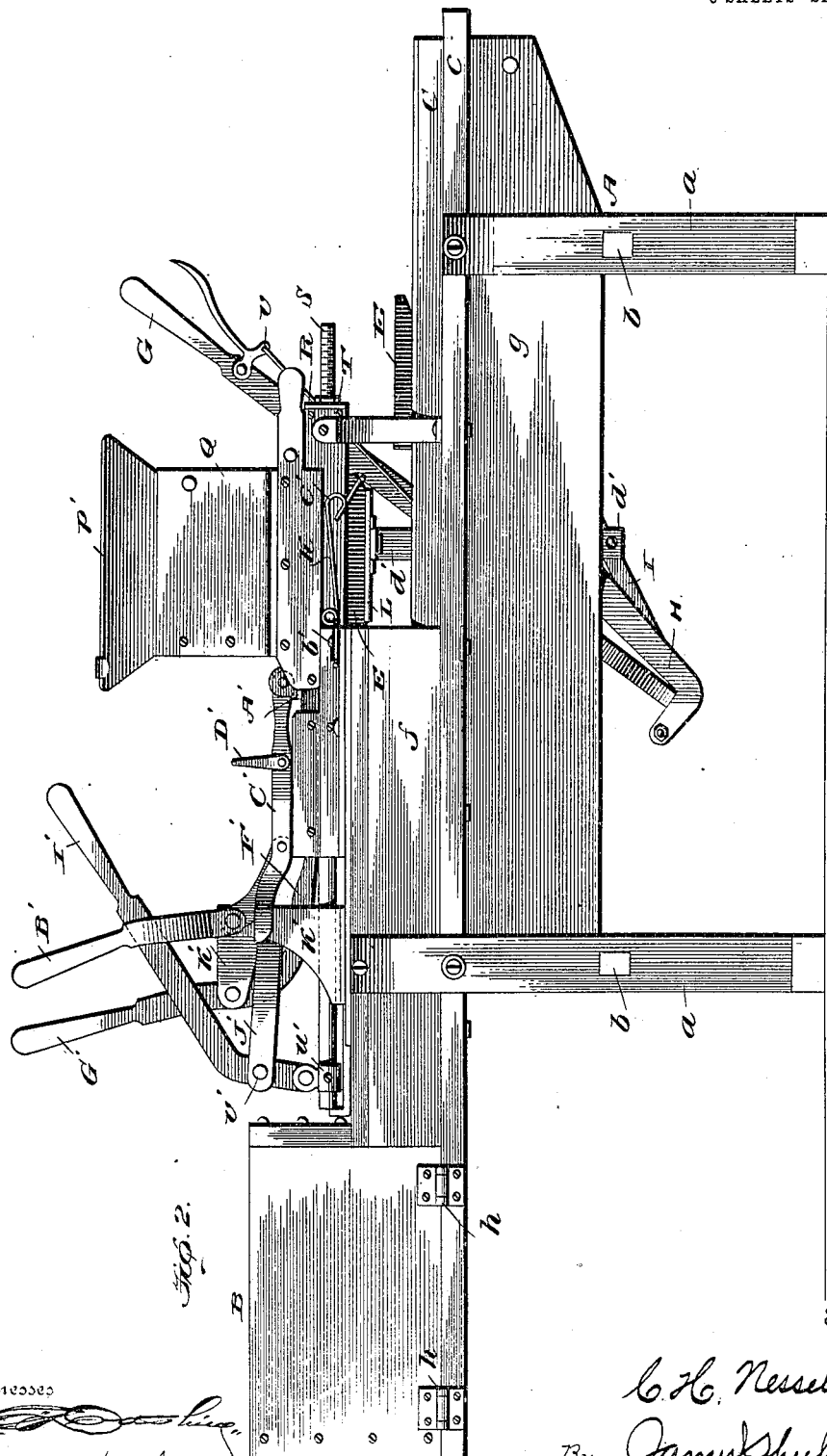
Figure 3:
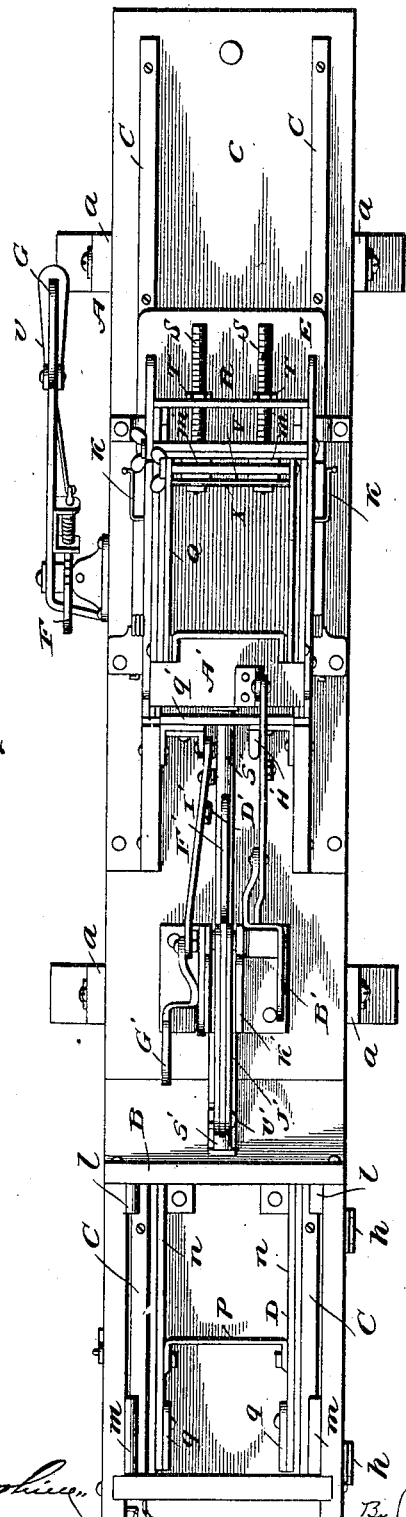
Figure 4:
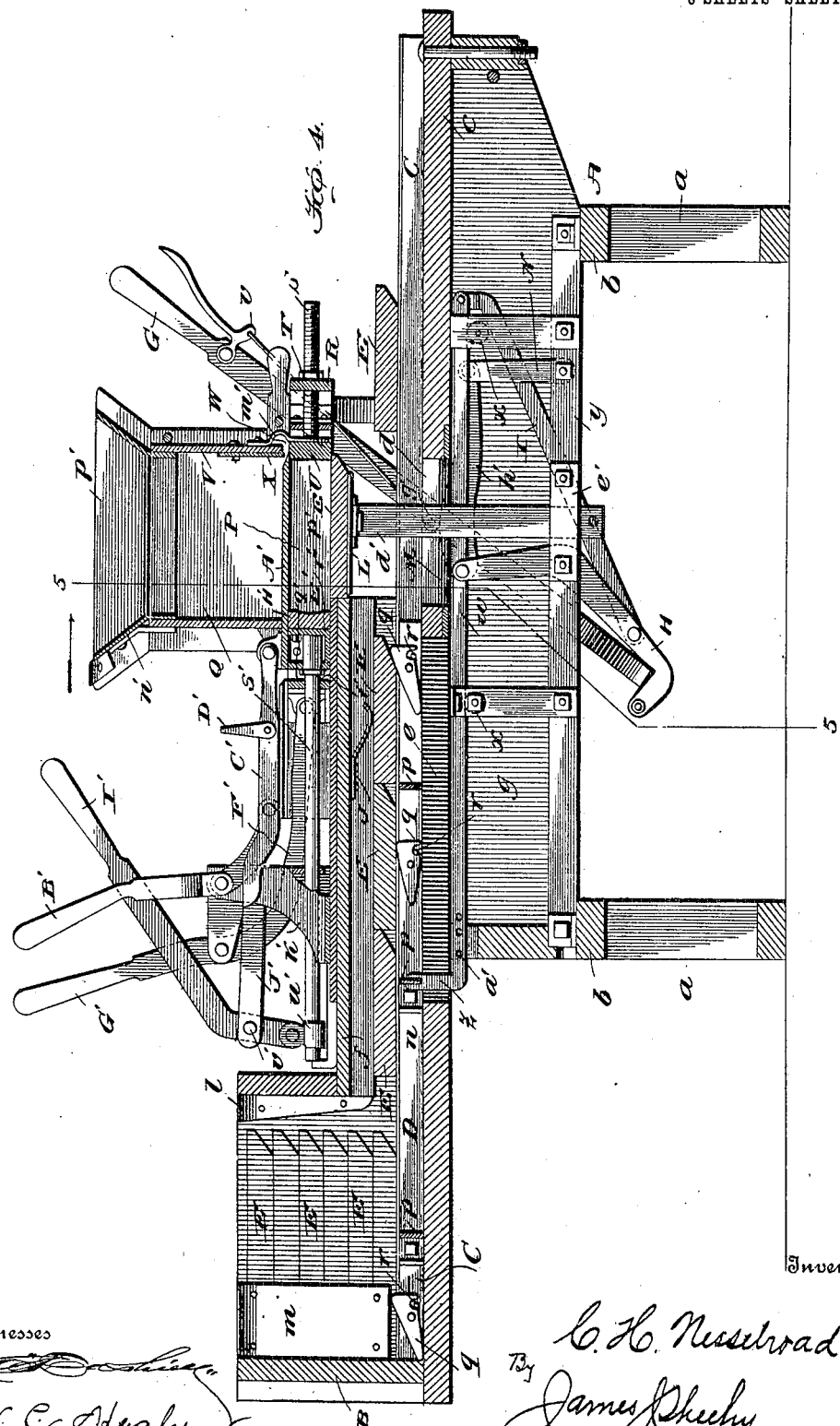
Figure 5:
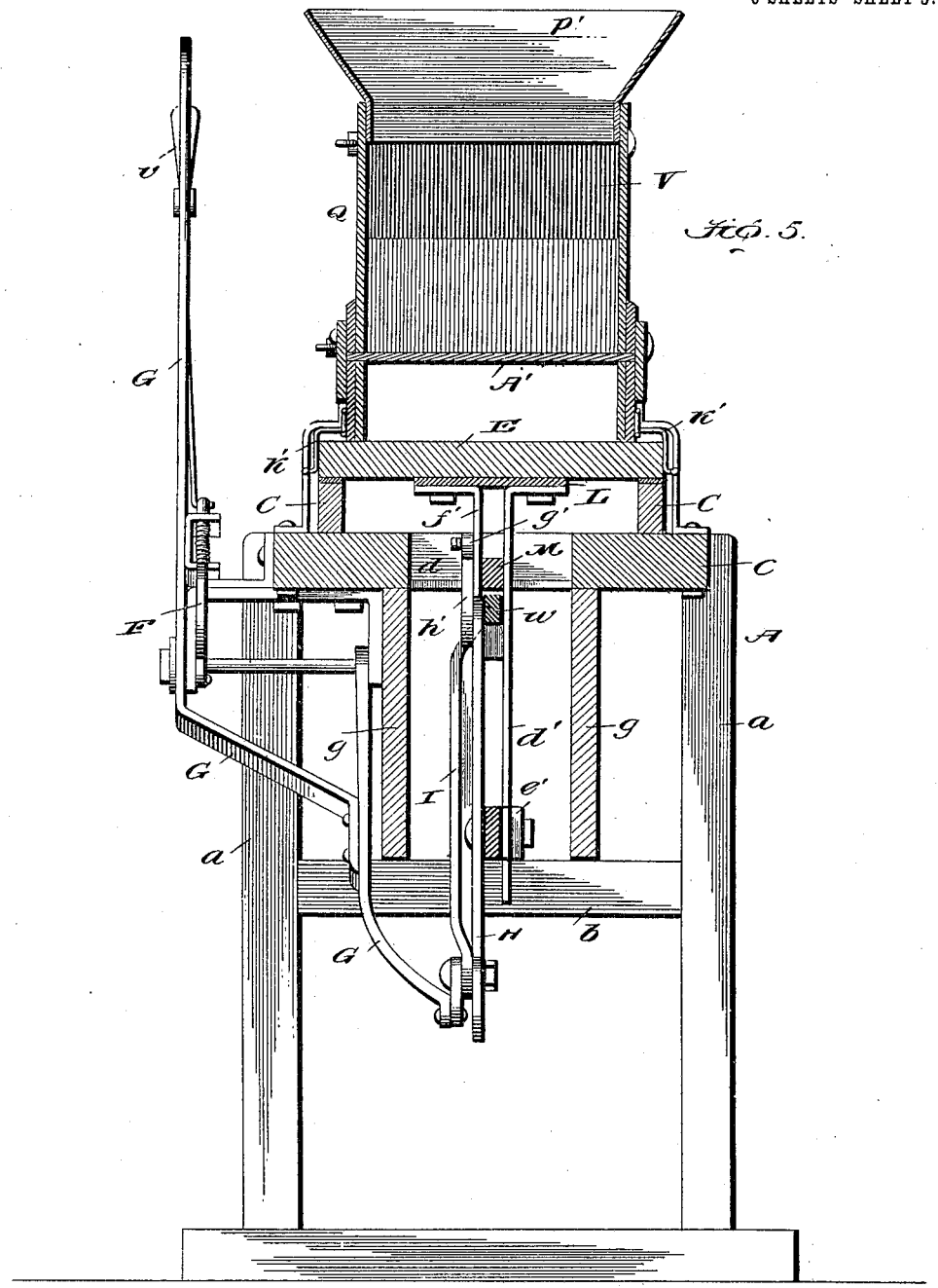
Figure 6:
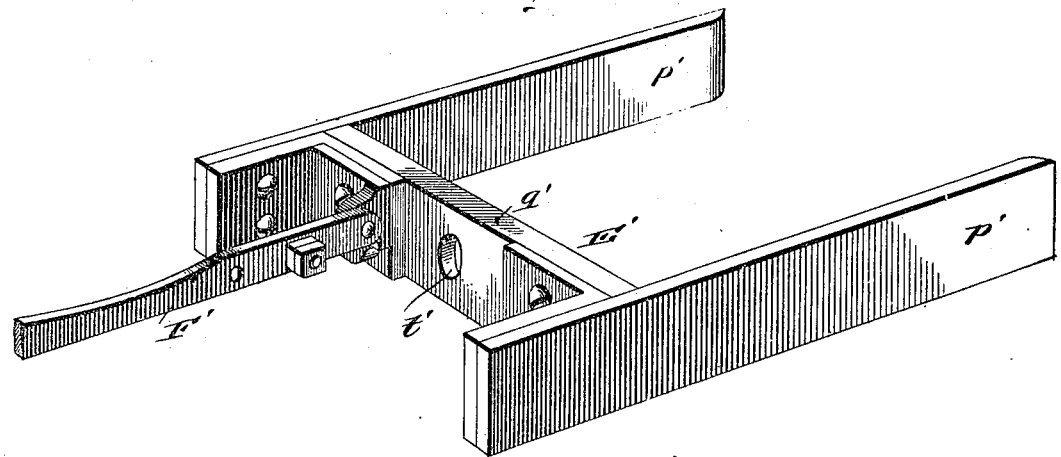
Figure 7:
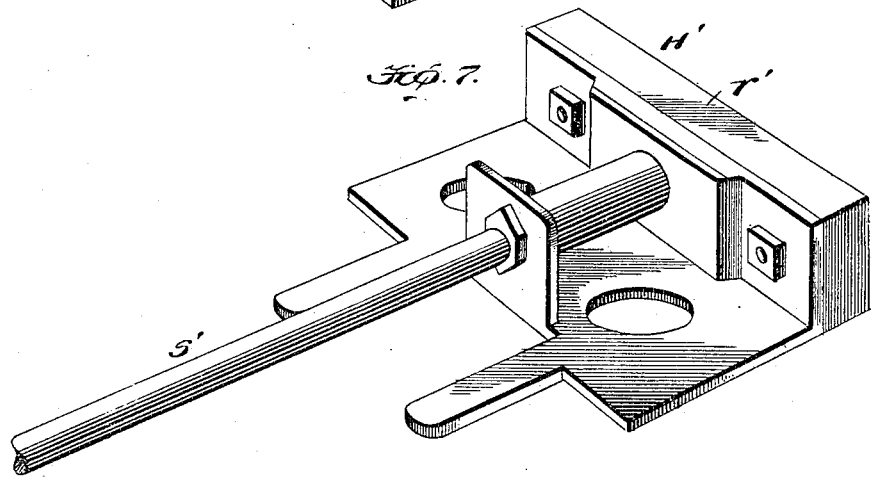
Figure 8:
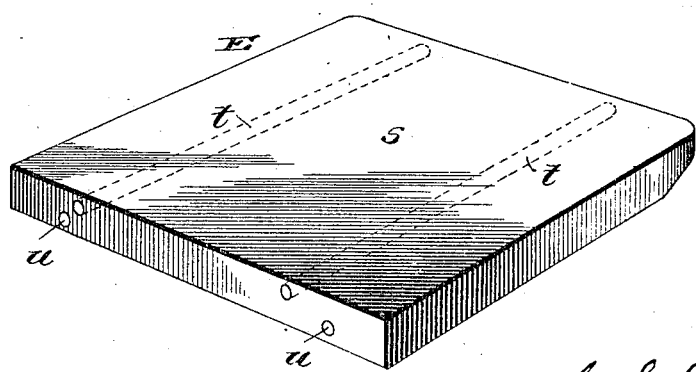

Figure 1 is a side elevation of the machine constituting the present and preferred embodiment of my invention. Fig. 2 is an elevation of the opposite side of the machine. Fig. 3 is a top plan view of the machine. Fig. 4 is a vertical section taken through the longitudinal center of the machine. Fig. 5 is a transverse section, on an enlarged scale, taken in the plane indicated by the line 5 5 of Fig. 4 looking in the direction indicated by the arrow. Fig. 6 is an enlarged detail perspective view of the device for affording clearance-spaces at opposite sides of a brick or other article subsequent to the molding and pressing thereof. Fig. 7 is a detail perspective view of the follower for subjecting the brick or other article to be formed to pressure, and Fig. 8 is a perspective view of one of the wood platens which I prefer to employ in the machine.

Similar letters designate corresponding parts in all of the views of the drawings, referring to which—

A is the main frame of the machine constituting the present and preferred embodiment of my invention, which machine is adapted for the manufacture of bricks. The said main frame A is preferably of wood and comprises uprights $a$, having cross-bars $b$ at intermediate points in their height, a platform $c$, supported by the uprights $a$ and having an opening $d$, preferably of rectangular form, and also having a longitudinal slot $e$, disposed in rear of the opening $d$, a housing $f$, arranged on the platform $c$ in rear of the opening $d$ and having side walls and a top wall, as plainly illustrated, and longitudinal skirts $g$, depending from the platform $c$ at opposite sides of the opening $d$ and the slot $e$.

B is a platen-box hinged at $h$ to the rear portion of the platform $c$ on the main frame A, so as to permit of it being swung laterally to a position at one side of the platform, for a purpose presently set forth. The said platen-box is normally retained in the position shown by a hook $k$, Fig. 1, and interiorly it is provided with fore-and-aft cleats $l$ and $m$, Figs. 3 and 4, the cleats $m$ being designed to keep superposed platens from falling back of the dogs on the platen-advancing carriage presently described, and the cleats $l$ having for their office to keep the superposed platens from locking against the front end of the platen-box as the platens drop when the carriage mentioned moves the lowermost platen forward.

C C are platen-supporting rails which extend from a point adjacent to the rear end of the platform $c$ to a point adjacent to the forward end thereof, Figs. 3 and 4, and are preferably formed by wood bars and straps of metal on said bars, as shown.

D is the platen-advancing carriage, and E E are the platens, of which latter any desired number may be employed with the machine. The carriage D is preferably of metal and comprises a body having two longitudinal bars $n$, movable at the inner sides of the rails C, and three (more or less) cross-bars $p$, interposed between and connecting the bars $n$, and three (more or less) pairs of dogs $q$, the dogs of each pair being arranged opposite each other and connected to the inner sides of the longitudinal bars $n$. Each of the dogs $q$ has a rear portion which is heavier than the forward portion thereof, and hence it will be apparent that while the dogs are adapted to tilt forward they will when released return to the position shown at the left of Fig. 4. The pins $r$ (shown under the forward arms of the dogs) have for their purpose to limit the forward tilting of the dogs and in that way assure prompt return of the dogs to their normal positions. The platens E may be of wood, metal, or other material compatible with the purpose of my invention without involving departure from the scope thereof. I prefer, however, to have them respectively comprise a wood body s, Fig. 8, the under side of the forward edge of which is beveled, metallic rods t, extending through the body and designed to preclude warping of the same, and metal brads u, driven into the rear edge of the body and arranged to be engaged by the dogs q, so as to prevent said dogs causing wear of the wood body.

The body of the platen-advancing carriage D is located below the tops of the rails C, and consequently the weight of the platens E is placed on the said rails C, which makes it easy to advance the platens through the medium of the carriage.

F is a segmental rack fixed at one side of the main frame A, and G is a vertically-swinging hand-lever fulcrumed at an intermediate point of its length and carrying a detent v, arranged to engage the rack and in that way adjustably fix the lever in the position in which it is placed. One of the functions of the hand-lever G is to reciprocate the platen-advancing carriage D, it being connected with said carriage through the medium of a longitudinally-slidable rod w, mounted on antifriction-rollers x in a fixed metallic frame y, Fig. 4, and having an upturned arm z at its rear end in which is a bifurcation receiving one of the cross-bars p of carriage D, an auxiliary vertically-swinging lever H, fulcrumed on the frame y and having one of its arms pivotally connected to the lower arm of lever G, and a rod I, connecting the said arm of lever H and the forward end of the bar w. On the said bar w is an adjustable stop a', which is adapted by bringing up against one of the uprights of the frame y to limit the forward stroke of the platen-advancing carriage D.

J, Fig. 4, is a curved spring-strip connected to the under side of the top wall of the housing f at a point slightly in rear of the opening d, and K K are spring-arms connected at b' to the top of the housing f and having portions c' arranged to normally rest slightly above the rails C. These springs J and K are designed to prevent the platens E shooting too far forward on a quick movement of the lever G.

L is an elevator for carrying the platens up against the open bottom of the mold, presently described, and M is a longitudinally-disposed bar which rests in the opening d of the main frame and is designed to support the elevator when the latter gravitates to its normal position slightly below the upper surface of the platform c. The elevator L is provided with a depending stem, which, as best shown in Fig. 5, is made up of a strap d', movable vertically in a guide e' on the frame y, and a comparatively short strap f', fixedly connected to the strap d' and arranged at the opposite side of the bar w and the bar M with reference to the said strap d'. On the strap f' of the elevator-stem is an antifriction-roller g', and this antifriction-roller rests on a cam-bar h', pivotally connected to the upper arm of the auxiliary lever H and also to a swinging arm N on the frame y, whereby it will be seen that when the hand-lever G is swung forward the elevator L will be raised, while when said lever G is swung toward the rear the elevator will be permitted to follow the cam-bar h' and gravitate to its lowermost position. It will also be apparent from the foregoing that the platen-advancing carriage will be moved toward the rear end of the machine on the forward movement of the hand-lever G and toward the front end of the machine on the rearward movement of said lever G. From this it follows that when the platen-box B is charged with superposed platens E, as shown in Fig. 4, and the hand-lever G is swung to and fro the platens will be moved one after the other on the rails C toward the forward end of the machine and the elevator L will be raised and lowered. When one of the platens E reaches a position above the elevator L, it will be seen that on the subsequent forward movement of the lever G the elevator will carry the said platen up against the under side of the mold, hereinafter described, in which position the platen will be secured by the engagement of the detent v on lever G with the segmental rack F. When the lever G is released from the segmental rack and swung toward the rear end of the machine, as after a brick is formed on the platen in the manner hereinafter described, the elevator L, with the platen thereon, will first be permitted to descend and then the carriage D will be moved forward, so as to enable the foremost platen on the carriage to assume a position above the elevator and by so doing to push the platen that was presented to the mold to the position shown at the right of Fig. 4.

It will be gathered from the foregoing that as each platen is moved up to the mold the spring-arms K will be carried up upon and by the platen, and consequently on the movement of the lever G toward the rear, the said spring-arms K, will serve the additional function of assisting the downward movement of the platen and the elevator on which the platen is arranged.

The operation described in the foregoing is repeated after the formation of each brick to move the brick-bearing platen forward on the rails C and present a fresh platen to the under side of the mold.

The platen-box B is adapted to be swung laterally to one side of the platform c in the manner before described in order to permit of the carriage D being readily introduced to its working position and as readily removed for repairs or for any other purpose.

P is the mold of the machine, which is preferably of metal and is fixed on the main frame A above the opening $d$ in the platform $c$ and is open at its lower and upper sides, and Q is a hopper fixed with respect to and disposed directly above the mold P. The side walls of the mold P are extended forward and are connected by a cross-bar R, through which loosely extend threaded rods S, bearing nuts T and on the inner or rear ends of the threaded rods S is carried the front wall U of the mold. The front wall V of the hopper Q is disposed slightly above the front wall U of the mold, so as to afford a space W between the two, and is connected to said wall U through the medium of forwardly-curved straps $m'$. When the nuts T are loosened, the walls U and V may be adjusted to increase or diminish the size of the mold and the hopper, and it will also be noticed that said walls U and V may be removed and replaced with other walls suitable to the form of brick or other article to be produced. It will further be noticed that one end wall $n'$ of the top section $p'$ of the hopper is adjustable on the remainder of said top section, so that the top section may be increased or diminished in size with the hopper Q.

X is a face-plate detachably connected to the inner side of the front wall V of hopper Q and resting at its lower edge on the mold-wall U, so as to close the space W. This face-plate X is designed for use when bricks are being made of coarse gravelly sand; but when fine sand is used to make the bricks the said face-plate X is removed, so as to enable the cut-off plate, presently described, to extend through the space W.

A' is the cut-off plate, which is supported by suitable slide-rests and is designed to be moved to and from a position between the mold P and the hopper Q. B' is a hand-lever for moving said cut-off plate, and C' is a link pivotally connected to and connecting the cut-off plate A' and the lower arm of lever B'. The said link C' is provided with an upwardly-extending projection D', which when the upper arm of lever B' is swung forward and downward to withdraw the cut-off plate from its position between the mold and the hopper is designed to engage the upper arm of the lever at a point adjacent to the fulcrum thereof, and in that way limit the outward movement of the cut-off plate.

E'. is the device for affording clearance-spaces at opposite sides of a brick or other article subsequent to the formation of the same in the mold. The said device E' comprises side bars $p'$ and a cross-bar $q'$ and is movable fore and aft immediately below the cut-off plate A'. It is connected, through a link F', with the lower arm of a hand-lever G'.

H' is a follower arranged between the side bars $p'$ and in front of the cross-bar $q'$ of the device E' and having a face-plate $r'$, which is detachable in order that it may be removed and replaced with another kind of face-plate when desired. The said follower also has a rod $s'$, which extends loosely through an aperture $t'$ in the cross-bar $q'$ of device E'. This rod $s'$ is connected, through the medium of an adjustable clamp $u'$, to a hand-lever I', the clamp $u'$ being adjustable in order to adapt the machine to make bricks of different sizes. The hand-lever I' is fulcrumed at $v'$ on a vertically-swinging link J', pivoted to the standard K', on which the levers B' and G' are fulcrumed, and hence it will be seen that when the lever I' is swung to the rear the follower H' will be moved forward, while when said lever I' is swung forward the follower H' will be moved toward the rear. It will also be seen that because of the lever I' being fulcrumed on the vertically-swinging link J' the lever as a whole moves down when the follower H' presses against the plastic material in the mold, and consequently great purchase is afforded with but little weight on the lever.

In the practical operation of the machine a platen E is secured against the under side of the mold P in the manner before described in detail, and the hopper Q is filled with plastic material suitable to the purpose. The lever B' is then thrown forward and backward to move the cut-off plate A' backward and forward and let the plastic material down into the mold P, after which the lever I' is thrown as far back as it will go in order to move the follower H' forward, and thereby press the brick. With this done the lever G' is pushed forward as far as it will go, so as to move the device E' rearwardly, and thereby afford clearance-spaces in the mold at opposite sides of the brick, and the lever J' is swung forward as far as it will go to afford a clearance-space at the rear side of the brick. Because of these clearance-spaces the brick will obviously freely leave the mold when the lever G is manipulated in the manner before described to take the brick from the mold and present a fresh platen to the mold. Subsequent to the presentation of the fresh platen to the mold the operation described is repeated.

I have entered into a detailed description of the construction and relative arrangement of the parts comprised in the present and preferred embodiment of my invention in order to impart a definite understanding of the said embodiment. I do not desire, however, to be understood as confining myself to the said specific construction and relative arrangement of parts, as such changes or modifications may be made in practice as fairly fall within the scope of my claimed invention.

Having described my invention, what I claim, and desire to secure by Letters Patent, is—

1. In a machine for making bricks and other articles of plastic material, the combination of a mold, a hopper, a cut-off plate movable between the mold and hopper, a reciprocatory follower and a reciprocatory device for affording clearance.

2. In a machine for making bricks and other articles of plastic material, the combination of a mold, a hopper, a cut-off plate movable between the mold and hopper, a reciprocatory follower and a reciprocatory device having side bars, whereby it is adapted to afford clearance at opposite sides of a brick or other article subsequent to the molding thereof.

3. In a machine for making bricks and other articles of plastic material, the combination of a mold, a reciprocatory follower, and a reciprocatory device for affording clearance.

4. In a machine for making bricks and other articles of plastic material, the combination of a mold, a reciprocatory follower, and a reciprocatory device having side bars, whereby it is adapted to afford clearance at opposite sides of a brick or other article subsequent to the molding thereof.

5. In a machine for making bricks and other articles of plastic material, the combination of a mold, a hopper, a cut-off plate movable between the mold and hopper, a reciprocatory device, for affording clearance and a reciprocatory follower having a stem extending loosely through the said device.

6. In a machine for making bricks and other articles of plastic material, the combination of a mold, a hopper, a cut-off plate movable between the mold and hopper, a reciprocatory device having a cross-bar and a side bar whereby it is adapted to afford clearance at opposite sides of a brick or other article subsequent to the molding thereof, and a follower disposed in front of the cross-bar of the device and having a stem extending loosely through the same.

7. In a machine for making bricks and other articles of plastic material, the combination of a mold, a reciprocatory device for affording clearance, and a reciprocatory follower having a stem extending loosely through the said device.

8. In a machine for making bricks and other articles of plastic material, the combination of a mold, a reciprocatory device having a cross-bar and side bars whereby it is adapted to afford clearance at opposite sides of a brick or other articles subsequent to the molding thereof, and a reciprocatory follower disposed in front of the cross-bar of said device and having a stem extending loosely therethrough.

9. In a machine for making bricks, the combination of a mold, a hopper, a reciprocatory cut-off plate, a reciprocatory clearance device, a reciprocatory follower, and hand-levers connected with the cut-off plate, the reciprocatory clearance device and the follower, respectively.

10. In a machine for making bricks and other articles of plastic material, the combination of a mold, a hopper, a reciprocatory cut-off plate, a reciprocatory clearance device having a cross-bar and side bars, a reciprocatory follower disposed in front of the cross-bar of said device and having a stem extending loosely therethrough, hand-levers connected with the cut-off plate and the clearance device, respectively, and a third hand-lever connected with the stem of the follower.

11. In a machine for making bricks and other articles of plastic material, the combination of a mold, a follower having a stem, a fixed standard, a vertically-swinging link pivoted to the standard, and a hand-lever fulcrumed at an intermediate point of its length on said link and having one of its arms connected with the stem of the follower.

12. In a machine for making bricks and other articles of plastic material, the combination of a mold having an adjustable front wall, a hopper having a front wall adjustable with that of the mold, and separated from said mold by a space, means fixedly connecting the said front walls of the mold and hopper, means for adjustably fixing the same, and a reciprocatory cut-off plate movable between the mold and hopper and in the said space.

13. In a machine for making bricks and other articles of plastic material, the combination of a mold having an adjustable front wall, a hopper having an adjustable front wall, separated by a space from that of the mold, means fixedly connecting the said front walls of the mold and hopper, means for adjustably fixing the same, a face-plate detachably connected to the front wall of the hopper and closing the said space, and a reciprocatory cut-off plate movable between the mold and the hopper.

14. In a machine for making bricks and other articles of plastic material, the combination of a mold, platens, a platen-box, rails extending into the platen-box and on which the platens bear, a carriage arranged below the rails and provided with means for engaging and advancing the platens on the rails, a platen-elevator, and means for actuating the carriage and elevator.

15. In a machine for making bricks and other articles of plastic material, the combination of a mold, platens, a platen-box, rails extending into the platen-box and on which the platens bear, a carriage arranged below the rails and provided with means for engaging and advancing the platens on the rails, a platen-elevator, a hand-lever, means for adjustably fixing the hand-lever, and connections between the hand-lever and the carriage and elevator for operating said carriage and elevator by the hand-lever.

16. In a machine for making bricks and other articles of plastic material, the combination of a mold, a platen, rails for supporting the platen and on which the platen bears, a platen-advancing carriage arranged below the rails and provided with means for engaging and advancing the platen, a platen-elevator, and means for actuating said carriage and elevator.

17. In a machine for making bricks and other articles of plastic material, the combination of a mold, a platen-box, rails for supporting platens, extending into the platen-box and under the molds, a platen-advancing carriage comprising a body located below the tops of the rails and dogs connected to the body and arranged to engage the platens, a platen-elevator, a hand-lever connected with and adapted to operate the carriage and the elevator, and means for adjustably fixing said hand-lever.

18. In a machine for making bricks and other articles of plastic material, the combination of a mold, a platen-box, rails extending into the platen-box and under the mold, platens, a platen-advancing carriage comprising a body movable below the tops of the rails and means for engaging the platens, a platen-elevator, spring-arms arranged to check the forward movement of the platens and also to be moved up by each platen so as to assist the subsequent down movement thereof, and means for actuating the carriage and elevator.

19. In a machine for making bricks and other articles of plastic material, the combination of rails for supporting platens, and a platen-advancing carriage comprising a body located below the tops of the rails, whereby the weight of the platens is placed on the rails, and dogs connected to the body and arranged to engage the platens.

20. In a machine for making bricks and other articles of plastic material, the combination of a mold, a platen, means for advancing the platen to a position below the mold, means for elevating the platen, and spring means arranged to check the forward movement of the platen and also arranged to move up with the platen so as to assist the subsequent downward movement thereof.

21. In a machine for making bricks and other articles of plastic material, the combination of a mold, a platen, a platen-advancing carriage, a platen-elevator, means for actuating said carriage and elevator, and spring, arms arranged to check the forward movement of the platen and also to be moved up by the platen so as to assist the subsequent down movement thereof.

22. In a machine for making bricks and other articles of plastic material, the combination of a mold, a platen-box, rails extending into the platen-box and under the molds, a platen-advancing carriage comprising a body located below the tops of the rails, and dogs connected to the body and arranged to engage the platens, a reciprocatory platen-elevator, spring-arms arranged to check the forward movement of the platens and also to be moved up by each platen so as to assist the subsequent down movement thereof, and means for actuating the carriage and elevator.

23. In a machine for making bricks and other articles of plastic material, the combination of a mold, a hopper above the mold, a reciprocatory cut-off plate, a clearance device, a follower, rails below the hopper for supporting platens, a platen-advancing carriage, a platen-elevator, a hand-lever connected with and adapted to operate the carriage and the elevator, and means for adjustably fixing said hand-lever.

24. In a machine for making bricks and other articles of plastic material, the combination of a frame, a reciprocatory platen-elevator having a stem, a swinging arm and an auxiliary lever mounted on the frame, a cam-bar engaging the stem of the elevator and pivotally connected to the swinging arm and the upper arm of the auxiliary lever, and a hand-lever connected to the auxiliary lever.

In testimony whereof I have hereunto set my hand in presence of two subscribing witnesses.

CHARLES H. NESSELROAD.

Witnesses:
CHARLES SCHLARB,
LUTHER NESSELROAD.